US011472322B1

(12) United States Patent
Baibak et al.

(10) Patent No.: US 11,472,322 B1
(45) Date of Patent: Oct. 18, 2022

(54) LUMBAR ADJUSTMENT ASSEMBLY

(71) Applicant: Brose Fahrzeugteile SE & Co. Kommanditgesellschaft, Coburg, Coburg (DE)

(72) Inventors: Matthew Baibak, Clarkston, MI (US); Philip Bartko, Macomb, MI (US); Anil Bhat, Rochester Hills, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/342,179

(22) Filed: Jun. 8, 2021

(51) Int. Cl.
*B60N 2/66* (2006.01)
*B60N 2/02* (2006.01)

(52) U.S. Cl.
CPC ......... *B60N 2/6673* (2015.04); *B60N 2/0232* (2013.01); *B60N 2002/0236* (2013.01)

(58) Field of Classification Search
CPC ........ B60N 2/6673; B60N 2/667; B60N 2/66; B60N 2/0232; B60N 2/0224; B60N 2002/0236
USPC ...................................................... 297/284.4
See application file for complete search history.

(56) References Cited

U.S. PATENT DOCUMENTS

| | | | | |
|---|---|---|---|---|
| 5,217,278 A | * | 6/1993 | Harrison | B60N 2/667 192/48.91 |
| 5,518,294 A | * | 5/1996 | Ligon, Sr. | B60N 2/6671 297/284.4 |
| 5,651,583 A | * | 7/1997 | Klingler | A47C 7/465 297/284.4 |
| 5,718,476 A | * | 2/1998 | De Pascal | A47C 7/462 297/284.4 |
| 5,913,569 A | * | 6/1999 | Klingler | B60N 2/6673 297/284.4 |
| 6,270,158 B1 | * | 8/2001 | Hong | B60N 2/666 297/284.7 |
| 6,676,214 B2 | * | 1/2004 | McMillen | B60N 2/666 297/284.4 |
| 7,862,119 B2 | * | 1/2011 | Schafer | B60N 2/6673 297/284.8 |
| 8,684,460 B2 | * | 4/2014 | Weir, III | B60N 2/66 297/284.4 |
| 9,254,768 B2 | * | 2/2016 | Hong | B60N 2/6673 |
| 9,604,559 B2 | * | 3/2017 | Yoo | B60N 2/6673 |
| 10,857,919 B2 | | 12/2020 | Ioppolo et al. | |
| 2004/0089784 A1 | * | 5/2004 | Garrido | B60N 2/0232 248/424 |

(Continued)

FOREIGN PATENT DOCUMENTS

DE 102011075514 A1 11/2012
WO 2018/060220 A1 4/2018

*Primary Examiner* — Mark R Wendell
(74) *Attorney, Agent, or Firm* — Brooks Kushman P.C.

(57) ABSTRACT

A lumbar adjuster for use in a vehicle seat including a lumbar mat, a frame member, and a support member. The lumbar mat is configured to face towards a backrest cushion when the lumbar adjuster is assembled to the vehicle seat. The frame member is configured to carry the lumbar mat. The support member is operatively coupled to the frame member and provided with a finger configured deflect from an extended position to a compressed position to bias portions of the lumbar mat towards backrest cushion to minimize a gap between the lumbar mat and the backrest cushion.

20 Claims, 5 Drawing Sheets

(56) References Cited

U.S. PATENT DOCUMENTS

| | | | | |
|---|---|---|---|---|
| 2004/0160099 A1* | 8/2004 | Hong | ................... | B60N 2/667 297/284.4 |
| 2010/0033002 A1* | 2/2010 | Di Giusto | ............ | B60N 2/6671 297/284.4 |
| 2013/0341982 A1* | 12/2013 | Maierhofer | ............ | B60N 2/666 297/284.4 |

* cited by examiner

LUMBAR ADJUSTMENT ASSEMBLY

TECHNICAL FIELD

The present disclosure relates to an adjustment mechanism for a vehicle seat.

BACKGROUND

Vehicle seats generally include a backrest that supports an occupant's back. If the backrest does not provide sufficient support to the occupant's back the occupant may experience back pain or fatigue. This pain and fatigue may be caused by overuse of ligaments and muscles experienced while or prior to the occupant being seated in the vehicle seat. This condition may be exacerbated if the occupant is seated for a prolonged period of time.

SUMMARY

According to one embodiment, a lumbar adjuster for use in a vehicle seat is provided. The lumbar adjuster may include a lumbar mat, an adjustment mechanism, and an adjustment member. The lumbar mat may be configured to face towards a backrest cushion when the lumbar adjuster is assembled to the vehicle seat. The adjustment member may be provided with a face and a biasing member that may extend from the face. The adjustment mechanism may be configured to move the adjustment member and the lumbar mat towards and away from the backrest cushion. The biasing member may be configured to bias portions of the lumbar mat towards the backrest cushion to minimize a gap between the lumbar mat and the backrest cushion.

According to another embodiment, a lumbar adjuster for use in a vehicle is provided. The lumbar adjuster may include a lumbar mat, a frame member, and a support member. The lumbar mat may be configured to face towards a backrest cushion of the vehicle seat when the lumbar adjuster is assembled to the vehicle seat and the frame member may be configured to carry the lumbar mat. The support member may be fixed to the frame member and may be provided with a finger that may be configured to deflect from an extended position to a compressed position to bias portions of the lumbar mat towards backrest cushion to minimize a gap between the lumbar mat and the backrest cushion.

According to yet another embodiment, a backrest assembly for use in a vehicle seat is provided. The backrest may include a backrest cushion, a lumbar mat, a frame member, and a support member. The backrest cushion may be configured to, in an occupied state, support an occupant seated in the vehicle seat. The lumbar mat may face towards the backrest cushion and the frame member may be configured to carry the lumbar mat. The support member may be fixed to the frame member and may be provided with a finger configured to bias the lumbar mat towards the backrest cushion when the backrest cushion in an unoccupied stated, not supporting the occupant, and wherein the finger is configured to deflect towards the support member when the backrest cushion is in the occupied state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring generally to the figures, a lumbar adjustment assembly 100 that may be provided with a lumbar mat 102, a frame member 104, and a support member 106. As an example, the lumbar adjustment assembly 100 may be configured for use in a backrest 108 of a vehicle seat. A backrest cushion 110 may be fixed to one or more portions of the backrest 108 and the lumbar mat 102 may be arranged to face towards the backrest cushion 110, when the lumbar adjustment assembly 100 is installed in the vehicle seat. The support member 106 may be coupled to or fixed to the frame member 104 and the frame member 104 may carry the lumbar mat 102.

The support member 106 may include a biasing member such as a finger 112 that may extend from the support member 106 to the lumbar mat 102. The finger 112 may bias the lumbar mat 102 towards the cushion 110 so that the lumbar mat 102 lies against and contacts the cushion. At a minimum, the finger 112 may bias the lumbar mat 102 towards the cushion 110 to prevent or minimize a gap between the cushion 110 and the lumbar mat 102. A gap between the lumbar mat 102 and the cushion may cause a number of problems. As one example, if the lumbar mat 102 is spaced apart from the backrest cushion 110, portions of the lumbar mat 102 may move between the cushion and the support member 106. This movement may cause a noise or rattle condition that may be distracting or annoying to an occupant in the vehicle.

To eliminate the gap and prevent this noise, the finger 112 may extend from the support member 106 so that the finger 112 engages and biases the lumbar mat 102 towards the backrest cushion 110. The finger 112 may be curved so that one or more portions of the finger 112 contact the lumbar mat as the support member 106 is actuated. As an example, when the support member 106 is in a first position, a distal end of the finger 112 may engage the lumbar mat 102 and when the support member 106 is in a second position, a front face 114 of the finger 112 may contact the lumbar mat 102. As another example, when a force is applied to the lumbar mat 102, such as when an occupant is seated in the vehicle seat, the finger 112 may deflect from an extended position to a retracted position so that the front face 114 is substantially congruent with a front face 116 of the support member 106. This may allow forces distribution of forces along the front face 114 of the finger 112 and the front face 116 of the support member 106. As an example, the front face 116 may define an aperture 160 and the finger 112 may extend from an inner periphery 162 of the aperture 160.

Figure 1:
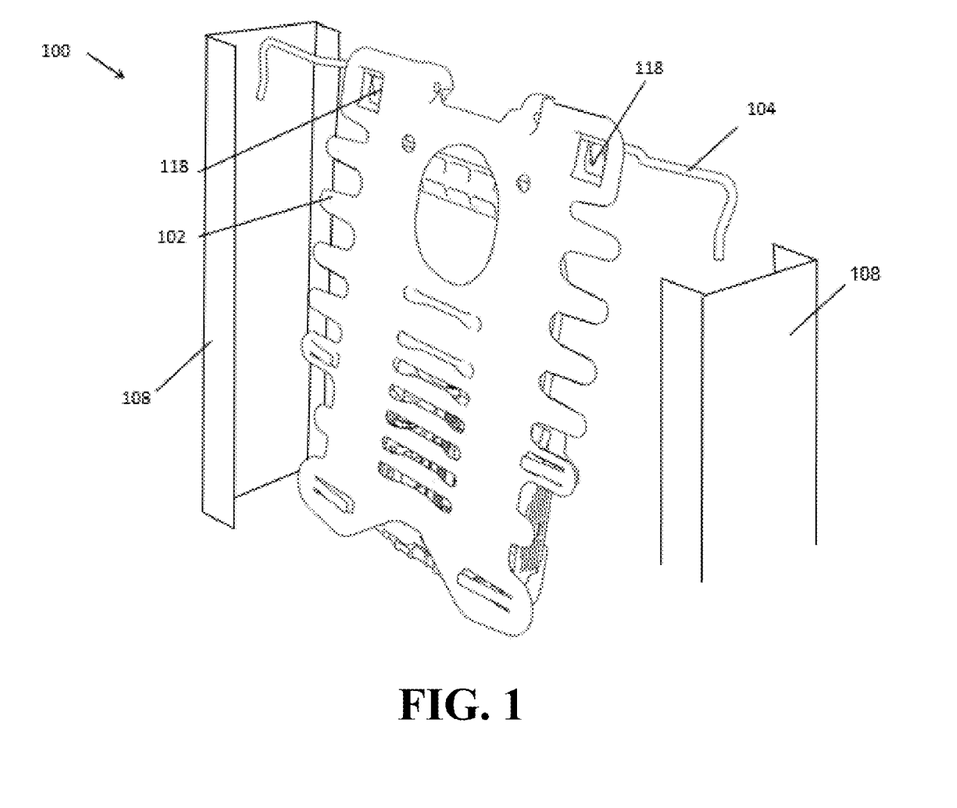
FIG. 1 illustrates an exploded perspective view of a portion of an exemplary backrest assembly including an exemplary lumbar adjuster assembly.

FIG. 1 illustrates a perspective view of an exemplary lumbar adjuster assembly 100 and a portion of a backrest 108. The adjuster assembly 100 may include a lumbar mat 102 that may be supported by a frame 104 that may include one or more wires 105. As an example, the lumbar mat 102 may include snaps 118 that may engage a number of wires 105 of the frame 104. Portions of the frame 104 such as the wires 105 may be fixed to a back frame or backrest 108.

Figure 2:
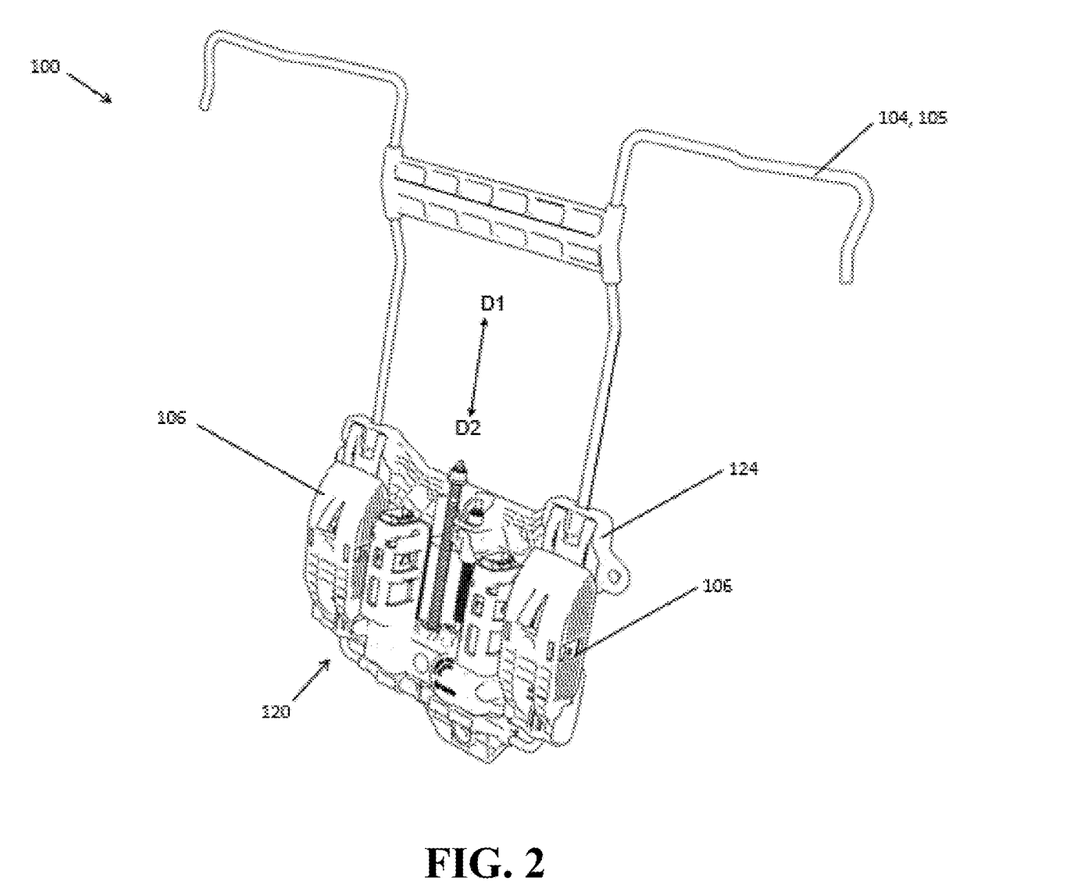
FIG. 2 illustrates a perspective view of the exemplary lumbar adjuster assembly shown in FIG. 1 without a lumbar mat.
Figure 3:
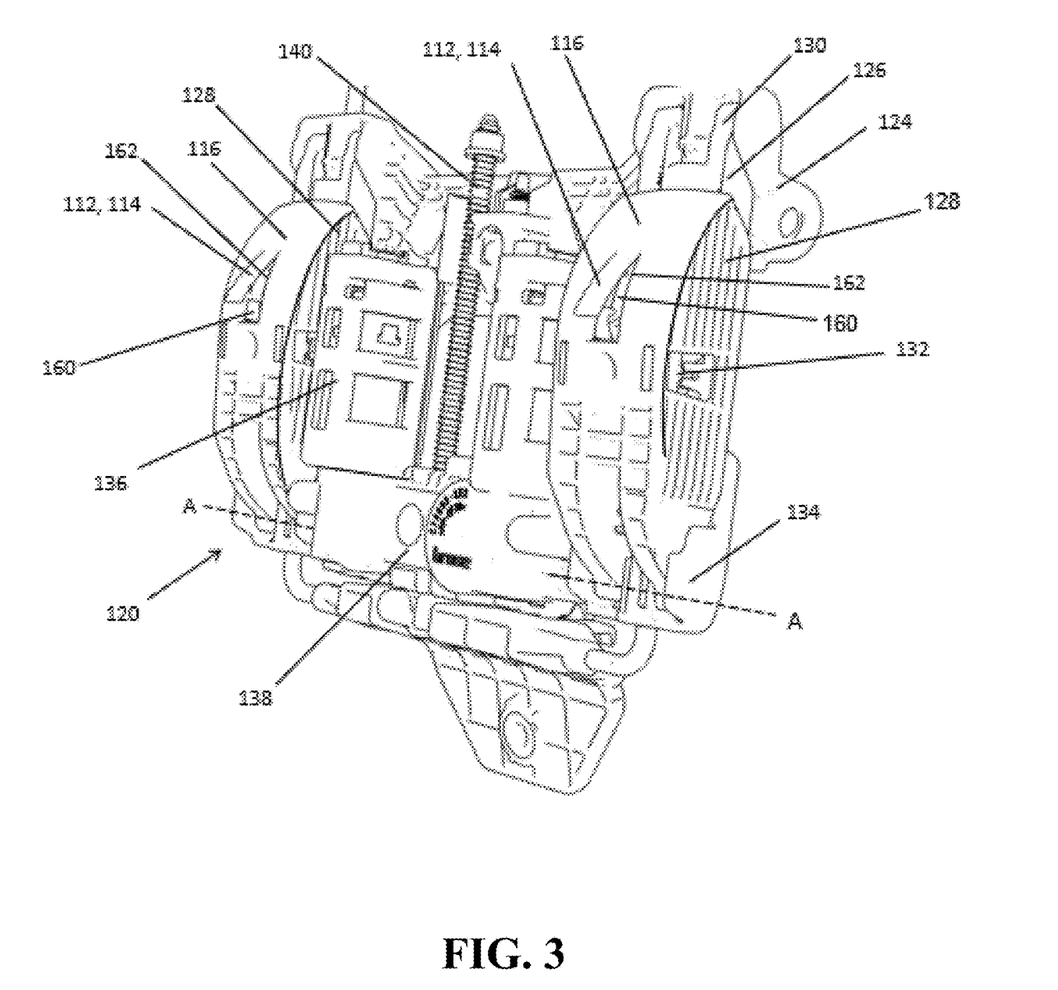
FIG. 3 illustrates a detail-perspective view of a portion of the exemplary lumbar adjuster assembly shown in FIG. 2.

FIG. 2 illustrates a perspective view of an exemplary lumbar adjuster assembly 100 without the lumbar mat 102. FIG. 3 illustrates a detail-perspective view of the lumbar adjuster assembly 100. The lumbar adjuster assembly 100 may include an adjustment mechanism 120 that may be configured to adjust, e.g., deflect the one or more portions of the lumbar mat 102 as required by an occupant. As an example, the adjustment mechanism 120 may include a linear drive 122 and a translating member such as an actuation bracket 124 that may be coupled to the linear drive 122 and configured to translate in first and second directions D1, D2.

One or more lever arms 126 may be pivotally coupled to the actuation bracket 124 and the support member 106. As an example, the support member 106 may include a number of lateral walls 128 and one or more portions of the lever, such as arm 126 may be connected to one or more of the lateral walls 128 so that the support member 106 may pivot about an end of the lever arm 126. The lever arm 126 may include a first end 130 that may be pivotally coupled to the actuation bracket 124 and a second end 132 that may be pivotally connected to the lateral wall 128. The frame 104 or the adjustment mechanism 120 may include a number of pivot brackets 134 and the support members 106 may be pivotally connected to one or more of the pivot bracket 134 so that the support members 106 pivot about a pivot axis A to adjust a position of the lumbar mat 102.

The adjustment mechanism 120 may include a motor 136 that may be coupled to a gearbox 138 that may operatively couple the motor 136 to a spindle 140. The spindle 140 may engage a spindle nut 142 that may be coupled to the actuation bracket 124. As another example, the spindle may be fixed to the actuation bracket 124 so that as the motor actuates, the spindle 140 and the actuation bracket 124 moves e.g., translates in the first and second direction D1, D2. Actuating the actuation bracket 124 may pivot and translate the first end 130 of the lever arm 126 so that the support member 106 pivots about the pivot axis A towards the lumbar mat 102. In one or more embodiments, the adjustment mechanism 120 may be a manually operated mechanism that may be adjusted by a lever or other actuation member as required.

Figure 4:
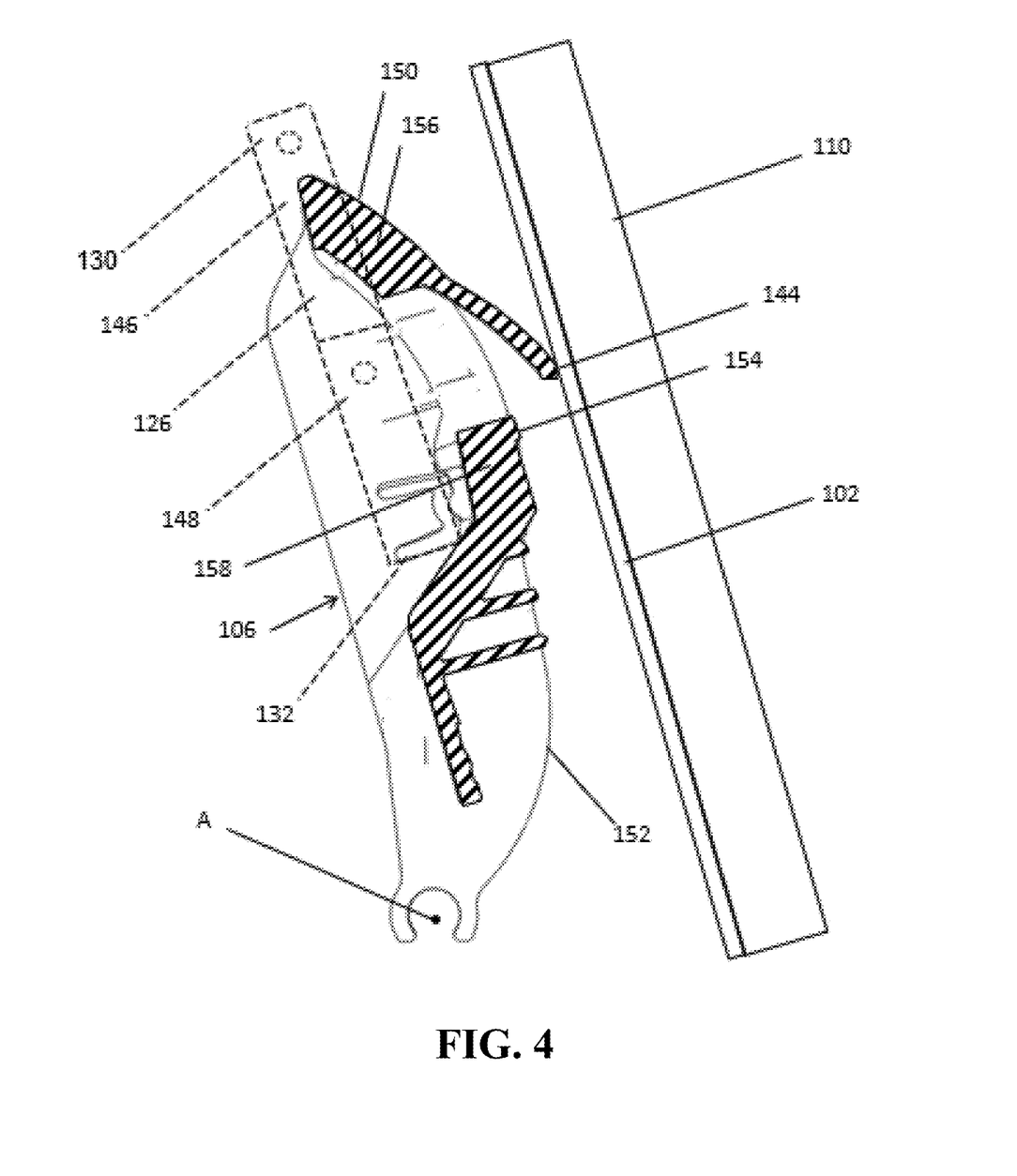
FIG. 4 illustrates a schematic partial-cross-sectional view of portions of the lumbar adjuster assembly in a first position.
Figure 5:
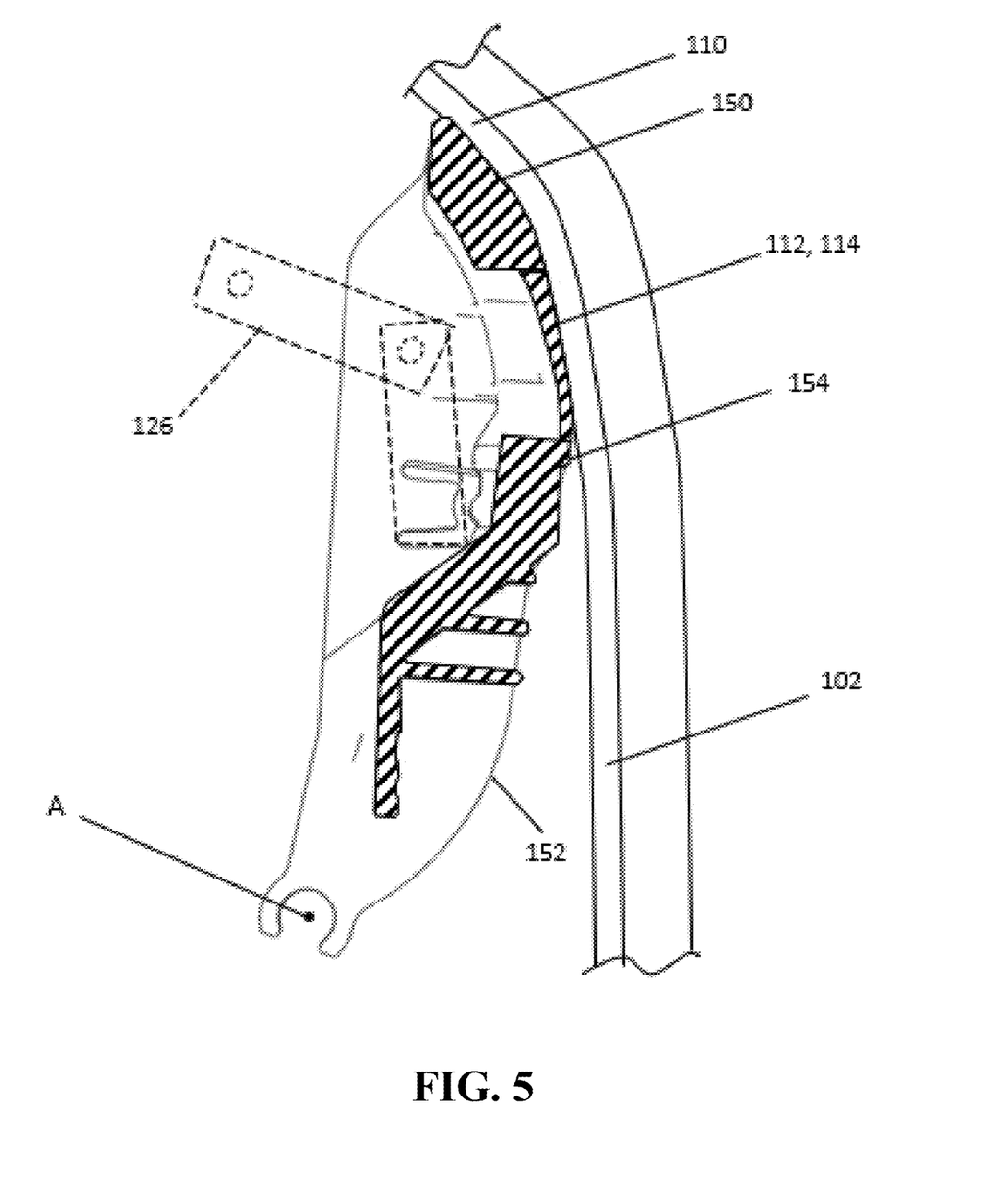
FIG. 5 illustrates a schematic partial-cross-sectional view of portions of the lumbar adjuster assembly in a second position.

FIG. 4 illustrates a schematic view of a portion of the lumbar adjuster assembly 100 including the support member 106 in a first position. FIG. 5 illustrates a schematic view of a portion of the lumbar adjuster assembly 100 including a support member 106 in a second position. A portion of the backrest cushion 110 lies along a portion of the lumbar mat 102. As an example, the lumbar adjuster assembly 100 and backrest cushion 110 are not in an occupied position so little or no force is applied to the cushion 110, the lumbar mat 102 and the lumbar adjuster 100. The finger 112 may be in an extended position and a distal end 144 of the finger 112 that may engage and bias the lumbar mat 102 towards the backrest cushion 110. When the seat is occupied, a force may be applied to the backrest cushion 110 that may deflect the backrest cushion 110 and the lumbar mat 102 so that each component 110, 102 deforms or bows towards the support member 106 to move the finger 112 from the extended position to the retracted position (FIG. 5).

In one or more embodiments, the lever arm 126 may include a first segment 146 that may include the first end 130 and a second segment 148 that may include the second end 132. The first segment 146 and the second segment 148 may be fixed to one another so that as the actuation member 124 (FIG. 3) translates the second segment 148 of the lever arm 126 may move the support member 106 to the lumbar mat 102. As an example, as the second segment 148 moves the support member 106, an upper portion 150 of the support member 106 may pivot towards the lumbar mat 102. A bottom portion 152 may form an opening that may define the pivot axis A. When the finger 112 is in the retracted position, the front face 114 of the finger 112 may be positioned substantially congruent with a front face 154 of the bottom portion 152 of the support member 106.

As an example, the finger 112 may be integrally formed with the support member 106. The support member 106 and the finger 112 may each be formed by one or more plastic or polymeric material. The support member 106 may have a substantially hollow body that may include a first wall 156 and a second wall 158. The first wall 156 may form portions of the front face 116 of the upper portion 150 and the second wall 158 may form at least a section of the bottom portion 152.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 lumbar adjuster assembly
102 lumbar mat
104 frame member
105 wires
106 support member
108 backrest
110 cushion
112 finger
114 front face finger
116 front face support member
118 snaps
120 adjustment mechanism
122 linear drive
124 actuation bracket
126 lever arm
128 lateral wall
130 first end
132 second end
134 pivot bracket
136 motor
138 gearbox
140 spindle
142 spindle nut
144 distal end
146 first segment
148 second segment
150 top portion
152 bottom portion
154 front face
156 first wall
158 second wall
160 aperture
162 inner periphery

What is claimed is:

1. A lumbar adjuster for use in a vehicle seat, the lumbar adjuster comprising:
a lumbar mat configured to face towards a backrest cushion when the lumbar adjuster is assembled to the vehicle seat;
an adjustment mechanism; and
an adjustment member provided with a front face facing the lumbar mat and a biasing member having a first end attached to the face and a second end extending outwardly from the front face to engage with the lumbar mat, wherein the adjustment mechanism is configured to move the adjustment member and the lumbar mat towards and away from the back cushion, wherein the biasing member is configured to bias the second end away from the face to urge portions of the lumbar mat towards the backrest cushion to reduce a gap between the lumbar mat and the backrest cushion.

2. The lumbar adjuster of claim 1, wherein the first end of the biasing member is flexibly attached to the face so that the second end is configured to deflect from an extended position to a compressed position.

3. The lumbar adjuster of claim 1, wherein the adjustment member includes a lever arm configured to articulate to move a portion of the adjustment member towards the lumbar mat.

4. The lumbar adjuster of claim 3, wherein the adjustment member includes an engagement member configured to engage a distal end of the lever arm and the biasing member is disposed above the engagement member.

5. The lumbar adjuster of claim 1, wherein the face is convex with respect the lumbar mat.

6. The lumbar adjuster of claim 1, wherein the adjustment member includes a top edge and a bottom edge and the biasing member is spaced apart from the top edge by a first distance and the biasing member is spaced apart from the bottom edge by a second distance, greater than the first distance.

7. The lumbar adjuster of claim 1, wherein the adjustment member includes a top portion, a bottom portion, and a medial portion extending therebetween, and the biasing member includes a proximal portion, extending from the top portion, and a distal end spaced apart from the medial portion.

8. The lumbar adjuster of claim 7, further comprising:
a frame including a first portion configured to carry the lumbar mat and a second portion spaced apart from the first portion, wherein the bottom portion of the adjustment member is pivotally coupled to the second portion of the frame.

9. A lumbar adjuster for use in a vehicle seat, the lumbar adjuster comprising:
a lumbar mat configured to face towards a backrest cushion when the lumbar adjuster is assembled to the vehicle seat;
a frame member configured to carry the lumbar mat; and
a support member operatively coupled to the frame member and provided with a finger configured to deflect from an extended position to a compressed position to bias portions of the lumbar mat towards the backrest cushion to reduce a gap between the lumbar mat and the backrest cushion.

10. The lumbar adjuster of claim 9, further comprising:
an adjustment mechanism configured to move the support member towards the lumbar mat to deflect portions of the backrest cushion and the finger from the extended position to the compressed position.

11. The lumbar adjuster of claim 9, wherein when an occupant is seated in the vehicle seat, the lumbar mat supports a portion of the occupant's back, in which first surfaces of the support member and the finger are substantially congruent with one another.

12. The lumbar adjuster of claim 9, wherein the support member includes a first face defining an aperture and the finger extends from an inner periphery of the aperture.

13. The lumbar adjuster of claim 12, wherein the first face includes a first curved portion defining the aperture, the first curved portion oriented convex with respect to the lumbar mat.

14. The lumbar adjuster of claim 12, wherein the finger includes a curved finger portion oriented convex with respect to the lumbar mat.

15. The lumbar adjuster of claim 12, wherein the support member has a U-shaped cross-section and includes a first lateral wall and a second lateral wall each extending away from the lumbar mat.

16. The lumbar adjuster of claim 15, further comprising:
a linear drive;
a translating member coupled to the linear drive and configured to translate in a first direction and a second direction; and
a lever arm including a first end pivotally coupled to the translating member and a second end fixed to at least one of the first lateral wall and the second lateral wall, wherein the support member is configured to pivot towards the lumbar mat as the translating member translates in either the first direction or the second direction, so that the finger contacts and moves along the lumbar mat.

17. A backrest assembly for use in a vehicle seat, the backrest structure comprising:
a backrest cushion configured to, in an occupied state, support an occupant seated in the vehicle seat;
a lumbar mat facing towards the backrest cushion;
a frame member configured to carry the lumbar mat; and
a support member operatively coupled to the frame member and provided with a finger configured to bias the lumbar mat towards the backrest cushion when the backrest cushion in an unoccupied stated and not supporting the occupant, and wherein the finger is configured to deflect towards the support member when the backrest cushion is in the occupied state.

18. The backrest assembly of claim 17, further comprising:
a pivot bracket fixed to the frame, wherein the support member is pivotally connected to the pivot bracket and configured to pivot about a pivot axis defined by the pivot bracket.

19. The backrest assembly of claim 18, wherein the support member includes a first end, a second end, and a front face extending therebetween, the finger extends from the front face and is spaced apart from the first end by a first distance and from the pivot axis by a second distance, wherein the second distance is greater than the first distance.

20. The backrest assembly of claim 18, wherein the finger is integrally formed with the support member.

* * * * *